UNITED STATES PATENT OFFICE 2,111,391

PROCESS OF TREATING ANIMAL FIBERS

Leo Frenkel, New York, N. Y., assignor to The Hatters' Fur Exchange, Inc., Walden, N. Y., a corporation of New York No Drawing. Application August 15, 1934, Serial No. 740,020

3 Claims. (Cl. 19—66)

This invention relates to a process of treating animal fibers and is particularly directed to a process of treating animal fibers so as to render them usable in substitution for high grade animal fibers and to impart spinning qualities to the same.

Some animal fibers, such as rabbit hair, mohair and the like, have no curl and are difficult to spin for the reason that they slip during the spinning operation. Furthermore, such fibers are unsatisfactory for use prior to my invention in that they shed in the finished material. The curling and adherent characteristics imparted to the fibers by my improved process enables the same to spin readily. I find also that the tendency to shed in the finished product is overcome by the present process.

In the first step of my process the fibers are first placed under a high vacuum in a suitable chamber or tank. The fibers are then impregnated with a weak aqueous solution of permanganate of potassium at a tepid temperature introduced under high pressure. This treatment is continued for a sufficient length of time to initiate the disintegration of the melanin of the fibers. Obviously this time will vary according to the nature of the fibers being treated, but ordinarily a few minutes will suffice. The liquid is then removed and the mass again placed under high vacuum.

I next introduce into the mass a degreasing agent, such, for example, as trichlorethylene or other suitable degreasing agent, which is left in place a sufficient length of time to degrease the fibers inside and outside and to further the disintegration of the melanin. This period also will vary depending upon the nature of the fibers being treated. Ordinarily about ten minutes will suffice.

I next reduce the temperature within the vacuum chamber to below zero either by forcing liquid air into the chamber or by other suitable refrigerating method. The fibers are left under this extremely low temperature a sufficient length of time entirely to freeze out the melanin. I then again produce a high vacuum to extract the remaining particles of the melanin. This step in my process is comparable to nature's method where the fur of animals which is colored during the summer changes to white in the winter, the melanin drying out due to the freezing and lightless conditions.

The temperature of the mass under treatment is then gradually raised to about 90° F. in any suitable manner as by the use of steam coils, while the mass is under vacuum and I then inject an astringent, such as glacial acetic acid, tannic acid or the like. The purpose of this astringent is to impart a glossiness to the fibers and at the same time to cause a shrinkage or contraction of the sheath of the fibers.

The next step in my process is to increase the temperature within the tank containing the fibers and glacial acetic acid to the boiling point and then extract the solution. The mass is then again placed under high vacuum and the temperature raised to 110 to 120° F. and an aqueous solution of alum introduced, the alum being in an amount approximately 5% of the weight of the fibers being treated. This treatment is continued for a sufficient length of time to produce a curling and adherence of the fibers. The sulphur particles and the glacial acetic acid embedded in the sheaths of the fibers coming in contact with the alum will act as a bite, causing the fibers to curl. The liquid of the mass is then extracted.

The mass is again placed under vacuum and curdled milk activated by yeast introduced, this stage of the process being continued for a sufficient length of time to produce a final whitening or bleaching of the fibers which have been yellowed by the action of the sulphur in contact with the alum. If desired the mass may be again treated with alum for increasing the curling effect of the first alum treatment.

The mass is finally rinsed and dried, if desired in vacuum, the final product having about a 4% moisture content.

It will be understood that the steps of my process as hereinbefore described may be varied; likewise the temperatures, percentages and duration of time in treating the fibers may also be varied within the purview of my invention.

What I claim is:—

1. The process of treating animal fibers which comprises placing the fibers under vacuum, introducing a degreasing agent into the mass, freezing the mass, again placing the mass under vacuum, gradually increasing the temperature, then introducing glacial acetic acid, increasing the temperature to the boiling point, removing the liquid, again placing the mass under vacuum, then introducing an aqueous solution of alum, again extracting the liquid, introducing a whitening agent and finally rinsing.

2. The process of treating animal fibers which comprises placing the fibers under vacuum, introducing an aqueous solution of permanganate of potassium under high pressure, removing the liquid, introducing trichlorethylene into the mass, introducing liquid air into the mass to freeze the same, and again producing substantially absolute vacuum, then introducing glacial acetic acid into the mass, increasing the temperature to the boiling point, removing the liquid, again placing the mass under vacuum, then introducing an aqueous solution of alum, again extracting the liquid, introducing a whitening agent and finally rinsing.

3. The process of treating animal fibers which comprises placing the fibers under vacuum, impregnating the fibers with an aqueous solution of permanganate of potassium, extracting the liquid, again producing absolute vacuum, degreasing the fibers and disintegrating the melanin of the fibers with trichlorethylene, freezing the mass by the introduction of liquid air, again producing vacuum, contracting the fibers by introducing glacial acetic acid into the mass, raising the temperature of the mass to the boiling point, extracting the liquid, again producing vacuum, curling the fibers by the introduction of an aqueous solution of alum, whitening the fibers by the introduction of curdled milk activated by yeast and finally rinsing.

LEO FRENKEL.